(12) United States Patent
Ehrhard

(10) Patent No.: US 8,297,703 B2
(45) Date of Patent: Oct. 30, 2012

(54) FOLD-DOWN VEHICLE SEAT

(75) Inventor: Winfried Ehrhard, Münster (DE)

(73) Assignee: GM Global Technology Operations LLC, Detroit, MI (US)

(*) Notice: Subject to any disclaimer, the term of this patent is extended or adjusted under 35 U.S.C. 154(b) by 320 days.

(21) Appl. No.: 12/491,549

(22) Filed: Jun. 25, 2009

(65) Prior Publication Data
US 2009/0322135 A1 Dec. 31, 2009

(30) Foreign Application Priority Data
Jun. 25, 2008 (DE) .................. 10 2008 030 234

(51) Int. Cl.
A47C 1/00 (2006.01)
(52) U.S. Cl. ................. 297/331; 297/340; 297/378.1
(58) Field of Classification Search .......... 297/341, 297/378.1, 378.12, 344.15, 331, 340
See application file for complete search history.

(56) References Cited

U.S. PATENT DOCUMENTS

| 4,699,418 | A | * | 10/1987 | Plavetich | 296/65.09 |
|---|---|---|---|---|---|
| 5,570,931 | A | * | 11/1996 | Kargilis et al. | 297/378.12 |
| 5,588,707 | A | * | 12/1996 | Bolsworth et al. | 297/378.12 |
| 5,700,055 | A | | 12/1997 | Davidson et al. | |
| 5,839,773 | A | * | 11/1998 | Ban et al. | 296/65.09 |
| 6,000,742 | A | | 12/1999 | Schaefer et al. | |
| 6,196,613 | B1 | | 3/2001 | Arai | |
| 6,455,948 | B1 | | 9/2002 | Berger | |
| 6,655,738 | B2 | * | 12/2003 | Kammerer | 297/331 |
| 6,817,670 | B2 | * | 11/2004 | Macey | 297/378.1 |
| 6,899,392 | B1 | * | 5/2005 | Saberan et al. | 297/334 |
| 7,108,306 | B2 | | 9/2006 | Suda et al. | |
| 7,152,921 | B2 | | 12/2006 | Saberan | |
| 7,300,107 | B2 | * | 11/2007 | Kammerer | 297/336 |
| 2001/0050502 | A1 | | 12/2001 | Fourrey et al. | |
| 2002/0125753 | A1 | | 9/2002 | Kammerer | |
| 2005/0104431 | A1 | | 5/2005 | Saberan et al. | |
| 2006/0055223 | A1 | | 3/2006 | Thiel et al. | |

(Continued)

FOREIGN PATENT DOCUMENTS
DE 4442813 A1 6/1995
(Continued)

OTHER PUBLICATIONS

German Patent Office, German Search Report for Application No. 102008030234.1, dated May 13, 2009.

(Continued)

Primary Examiner — Sarah B McPartlin
(74) Attorney, Agent, or Firm — Ingrassia Fisher & Lorenz, P.C.

(57) ABSTRACT

A fold-down vehicle seat is provided having a seat part and a foldable backrest. The seat part is mounted so it is pivotable on the vehicle floor via a front rocker and the backrest is mounted so it is pivotable on a seat framework section using a lower end section. In such a vehicle seat, the seat part and the backrest are transferable into a first and a second folded position to enlarge a cargo area of the vehicle adjoining the vehicle seat, the seat part being coupled using a rear rocker to the backrest, and the seat framework section supporting the backrest situated so it is displaceable on the vehicle floor in the vehicle longitudinal direction.
In this way, a fold-down driver seat is provided, which has a high degree of user friendliness and is universally adaptable to various cargo space configurations.

17 Claims, 5 Drawing Sheets

U.S. PATENT DOCUMENTS

| | | |
|---|---|---|
| 2006/0214459 A1 | 9/2006 | Kammerer et al. |
| 2007/0200412 A1 | 8/2007 | Abraham |
| 2009/0256379 A1 | 10/2009 | Yamada et al. |
| 2010/0052390 A1 | 3/2010 | Dagcioglu et al. |

FOREIGN PATENT DOCUMENTS

| | | |
|---|---|---|
| DE | 19514380 A1 | 11/1995 |
| DE | 19812140 C1 | 10/1999 |
| DE | 19812268 C1 | 10/1999 |
| DE | 19838882 A1 | 3/2000 |
| DE | 19933423 A1 | 1/2001 |
| DE | 19957380 C1 | 3/2001 |
| DE | 10239112 A1 | 3/2004 |
| DE | 10315375 A1 | 11/2004 |
| DE | 10355819 A1 | 6/2005 |
| DE | 102004047250 A1 | 6/2005 |
| DE | 102004006727 B3 | 7/2005 |
| DE | 102005037405 A1 | 3/2006 |
| DE | 102007005209 A1 | 6/2008 |
| EP | 0881970 A2 | 12/1998 |
| FR | 2804072 A1 | 7/2001 |
| FR | 2849630 A1 | 7/2004 |
| GB | 2417197 A | 2/2006 |
| WO | 2004060713 A1 | 7/2004 |
| WO | 2006089191 A1 | 8/2006 |
| WO | 2007076612 A1 | 7/2007 |
| WO | 2008015526 A2 | 2/2008 |
| WO | 2008030659 A | 2/2008 |

OTHER PUBLICATIONS

British Patent Office, British Search Report for Application No. 0910935.6, dated Sep. 18, 2009.

British Patent Office, British Examination Report for Application No. 0910935.6, dated Jan. 6, 2012.

* cited by examiner

FOLD-DOWN VEHICLE SEAT

CROSS-REFERENCE TO RELATED APPLICATION

This application claims priority to German Patent Application No. 102008030234.1, filed Jun. 25, 2008, which is incorporated herein by reference in its entirety.

TECHNICAL FIELD

The invention generally relates to a fold-down vehicle seat.

BACKGROUND

Fold-down vehicle seats allow the provision of additional cargo space, for example, for luggage, the backrest of the vehicle seat being able to be folded forward to form a so-called "seat package". Package formations of this type may be achieved, for example, in adjustable-height motor vehicle seat in that the seat is first lowered to the lowest possible level. Subsequently, the backrest is then folded forward, until it assumes an essentially parallel position to the vehicle floor, its front side resting on the seat part cushion. In many of the embodiments known in the prior art, the lowering of the seat part and the folding of the backrest occur independently of one another, which impairs the operating comfort.

Furthermore, a motor vehicle seat which can be lowered, having a backrest foldable around a folding axis fixed on the seat part, is known from DE 198 12 268 C1, the seat part being mounted on a front rocker and a rear rocker and the rockers each having an upper rotational axis with the seat part and a lower rotational axis with the vehicle floor. Furthermore, a rigid coupling element is provided, which couples the movement of the backrest to the rear rocker of a seat parallelogram of the seat part in such a way that pivoting of the backrest results in lowering of the seat part, so that at the end of the folding procedure, the backrest is oriented essentially parallel to the vehicle floor and the seat part rests flat on the vehicle floor.

The rigid coupling of backrest and seat part is fundamentally well suitable to form a seat package. However, it is disadvantageous here that the rigid coupling of backrest and seat part requires a folding procedure which is always executed identically The formation of a "seat package" may also be disadvantageous in regard to certain loading requirements of a motor vehicle, because the two vehicle seat components which rest one on another, seat part and backrest, occupy a certain installation space height.

At least one object of the present invention is therefore to provide a fold-down vehicle seat, which has a higher degree of user friendliness and which is also universally adaptable to different cargo space configurations. In addition, other objects, desirable features, and characteristics will become apparent from the subsequent summary and detailed description, and the appended claims, taken in conjunction with the accompanying drawings and this background.

SUMMARY

The vehicle seat according to an embodiment of the invention is implemented as a fold-down vehicle seat and has a seat part and a fold-down backrest. The seat part is linked via a front rocker on the vehicle floor so it is pivotable, while the backrest is mounted using a lower end on a seat framework, or a seat framework section, so it is pivotable.

The fold-down vehicle seat according to the embodiment of the invention is distinguished in that the seat part and the backrest are transferable into a first folded position and a second folded position to enlarge a cargo area of the vehicle, which adjoins the vehicle seat, typically from the rear. Both folded positions of the vehicle seat provide an enlargement of the cargo area in relation to the basic position of the seat, in which a vehicle occupant can sit down on the seat.

However, the two folded positions, the first and second folded positions, differ fundamentally from one another, so that the vehicle seat may be transferred into the particular more suitable folded position for different loading requirements.

This is achieved by the design in that the seat part is mechanically coupled to the backrest using a rear rocker, and the seat framework section supporting the backrest is situated so it is displaceable on the vehicle floor in the vehicle longitudinal direction. The front and rear rockers form a type of seat parallelogram together with the seat part and the vehicle floor via the backrest and the seat framework section. Specifically, a pivot movement of the backrest directed forward is transmitted to the seat part via the rear rocker, which may be pivoted, because of the pivotable mounting via the front rocker, forward and into a position which is lowered in relation to the basic position.

The front rocker is linked so it is pivotable with one end section to a frontal area of the seat part facing away from the backrest on its bottom side, while the other end section of the rocker is mounted directly on the vehicle floor or on a component which is displaceable along the vehicle floor. The coupling of backrest and seat part has a double function. Depending on whether the vehicle seat is to be transferred into the first or the second folded position, the rear rocker transmits a translational movement to the seat part during the transition into the first folded position, while upon the transition from the basic position into the second folded position, a type of coupled pivot and displacement movement is transmitted from the backrest to the seat part.

According to an advantageous embodiment of the invention, the rear rocker is linked at one end on the seat part and at the other end on the backrest above its folding axis (i.e., the linkage point of the rear rocker on the backrest lies above the folding or pivot axis of the backrest on the seat framework section). Because of this linkage of the rear rocker spaced apart radially from the folding axis of the backrest, upon pivoting, in particular when the backrest is folded down, a translational movement of the seat part directed forward may be initiated.

It is particularly provided that the rear rocker is implemented as curved or approximately L-shaped. A curved, therefore L-shaped or angled design of the rear rocker is particularly advantageous for the transmission of a translational movement to the seat part. The angle which the two end sections of the rear rocker, which are linked on seat part and backrest, assume to one another is between approximately 90° and approximately 160°. The concrete design is selected in such a way that in particular upon initiation of a pivot or folding movement of the backrest, no dead center position occurs, so that the seat part is always moved forward as a result of a folding movement of the backrest.

According to another embodiment of the invention, it is provided that the seat part is transferable using the rear rocker as a result of a folding movement of the backrest directed forward into a first folded position, which is offset forward and lowered in relation to the basic position. While the backrest folded forward transmits a translational movement directed forward onto the rear section of the seat part, its translational movement has the result that the front rocker executes a movement directed forward and downward in a circular arc, so that the seat part, upon reaching the first folded position, has its bottom side resting nearly completely on the vehicle floor, or is situated essentially parallel thereto.

Upon transfer of the vehicle seat into its first folded position, it is further provided that the seat part is guided using its section which is coupled to the rear rocker so it is longitudinally displaceable on or in a floor-side guide (i.e., the rear part of the seat part, which comes to rest directly adjoining the lower part of the backrest, completes a translational movement, in particular a linear movement, along the floor-side guide, which may be implemented as rail-like, for example, as a seat longitudinal rail, upon transfer of the vehicle seat from its basic position into the first folded position).

During the transfer from the basic position into the first folded position, the backrest only completes a pivot movement around its folding axis, the folding axis itself and the associated seat framework section being subject to essentially no displacement movement in relation to the vehicle. The seat framework section is typically locked on the floor-side guide or on the vehicle floor.

It is further provided according that the backrest and the seat part come to rest directly one on another upon reaching the first folded position and are oriented essentially parallel to the cargo floor of the vehicle or parallel to the vehicle floor. This folded position represents a so-called "seat package", the front side of the backrest and the top side of the seat surface lying directly one on another and also the rear side of the backrest being oriented aligned and/or flush to the cargo floor of the vehicle, so that in the final effect, a flat and continuous cargo area may be provided for receiving transport material.

In contrast to the first folded position, in the second folded position, the seat part and the backrest assume an essentially vertical orientation, the backrest preferably being oriented along the vehicle vertical axis and being displaced forward in relation to the basic position. In this configuration of backrest and seat part, the cargo space is delimited at the front by the rear side of the backrest. In contrast to the first folded position, the two vehicle seat components do not come to rest below the cargo floor in this case, however, so that the cargo space provided in the second folded position is implemented higher on its front area adjoining the vehicle seat than the cargo space which may be achieved using the first folded position.

To transfer the vehicle seat into the second folded position, it is provided that the seat framework section on which the backrest is mounted so it is pivotable is displaced forward along the floor-side guide. The backrest of the vehicle seat may be locked in an upright position on the seat framework section, so that a user, through a force action directed forward on the backrest, may cause the corresponding displacement movement of the backrest and the seat framework section directed forward.

In contrast to the first folded position, it is provided in the second folded position that the seat part passes using its rear section, which is coupled to the rear rocker, into a position raised relative to the floor-side guide. For this purpose, a positive guiding of the rear seat part section on the floor-side guide is thus canceled, so that the seat part may swing forward using its rear section and, as a result of the displacement of the backrest directed forward, may perform a pivot movement directed forward overall and a pivot movement directed downward using its front section and a pivot movement directed upward using its rear section, so that the seat part, similarly to the backrest, also may assume an essentially vertical orientation upon reaching the second folded position.

In this vertical orientation, the front section of the seat part, which is coupled to the front rocker, comes to rest on the bottom and the rear section of the seat part, which is coupled to the rear rocker, comes to rest on top.

According to a further especially advantageous design, a folding lever extends below the seat part, which is linked at one end on the rear area of the seat part and which is mounted at the other end so it is displaceable in a floor-side longitudinal guide. The mounting of the folding lever in the longitudinal guide allows the translational movement of the seat part directed forward upon transfer from the basic position into the first folded position. However, as soon as the positive guiding of the rear seat part section on the floor-side guide is canceled, the folding lever forms a four-bar linkage with the front rocker, the longitudinal guide, and the seat part, which allows pivoting of the entire seat part directed forward and downward.

It is particularly provided that the end section of the folding lever facing toward the front rocker is mounted so it is pivotable and displaceable in an oblong hole of the longitudinal guide. The oblong hole guide of the pivot leader is also exploited upon the transfer of the vehicle seat from its basic position into the second folded position. The linkage point of the folding lever on the longitudinal guide side comes to rest on a front end section of the oblong hole both upon reaching the folded position and also upon reaching the second folded position.

During the transfer of the vehicle seat out of its second folded position into the basic position, the other end of the oblong hole, facing toward the cargo space, forms a delimitation for the linkage point of the folding lever. The displacement delimitation for the folding lever provided by the oblong hole in both directions finally causes a positively-guided pivot movement of the seat part to transfer the vehicle seat from its basic position into the second folded position and vice versa.

According to a further embodiment of the invention, it is provided that at least one spring element, in particular a leg spring, is situated in the area of the attachment of the folding lever on the seat part. This spring element is used for the purpose of initiating the upwardly directed pivot movement of the rear seat part section in order to avoid a possible dead center location of the pivotable vehicle seat parts. In addition, the spring constant of the spring element may be designed in such a way that the force provided by the spring element makes it significantly easier to transfer the vehicle seat into its second folded position. With the aid of a correspondingly dimensioned spring, an especially smooth folding mechanism, which is simple to operate, may be provided.

Furthermore, it is provided in the scope of the invention that the seat part is lockable on the floor-side guide at least using its section coupled to the rear rocker. This lock, which can be disengaged, specifies in particular that the vehicle seat is transferred, starting from its basic position, either into the first folded position or into the second folded position.

As a supplement, it is provided that the seat framework section which is longitudinally displaceable on the floor-side guide is lockable on the floor-side guide so it can be disengaged. The locks on the seat framework and the seat part may be coupled directly to one another. If both locking mechanisms are disengaged from the floor-side guide, the vehicle seat may be transferred, starting from its basic position, into the second folded position. If both locks, on the seat part and on the seat framework, are locked on the floor-side guide, the seat cannot be moved, it is then located in its usage position. However, if only the lock on the seat part is disengaged in such a way that the seat part is positively guided along the guide and is displaceable along it, the vehicle seat may be transferred, starting from its basic position, into the first folded position.

The optional, but thus advantageous coupling of locks on the seat part and on the seat framework ensures that no configurations of the seat may occur in which only one of the two locks is disengaged, which may result in a malfunction when folding down the vehicle seat under certain circumstances.

Furthermore, it is provided that the seat part and/or the backrest are lockable both in their basic position and also in the first and/or in the second folded positions using locking means provided for this purpose, for example, using a suitable catch mechanism, so that independent disengagement and unlocking of seat part and/or backrest may be effectively suppressed from the basic position, from the first folded position, and from the second folded position.

Advantageous possible applications and features of the present invention result from the following description of the figures, all features shown therein and also described using words forming the subject matter of the present invention both alone and also in any reasonable combination with one another.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
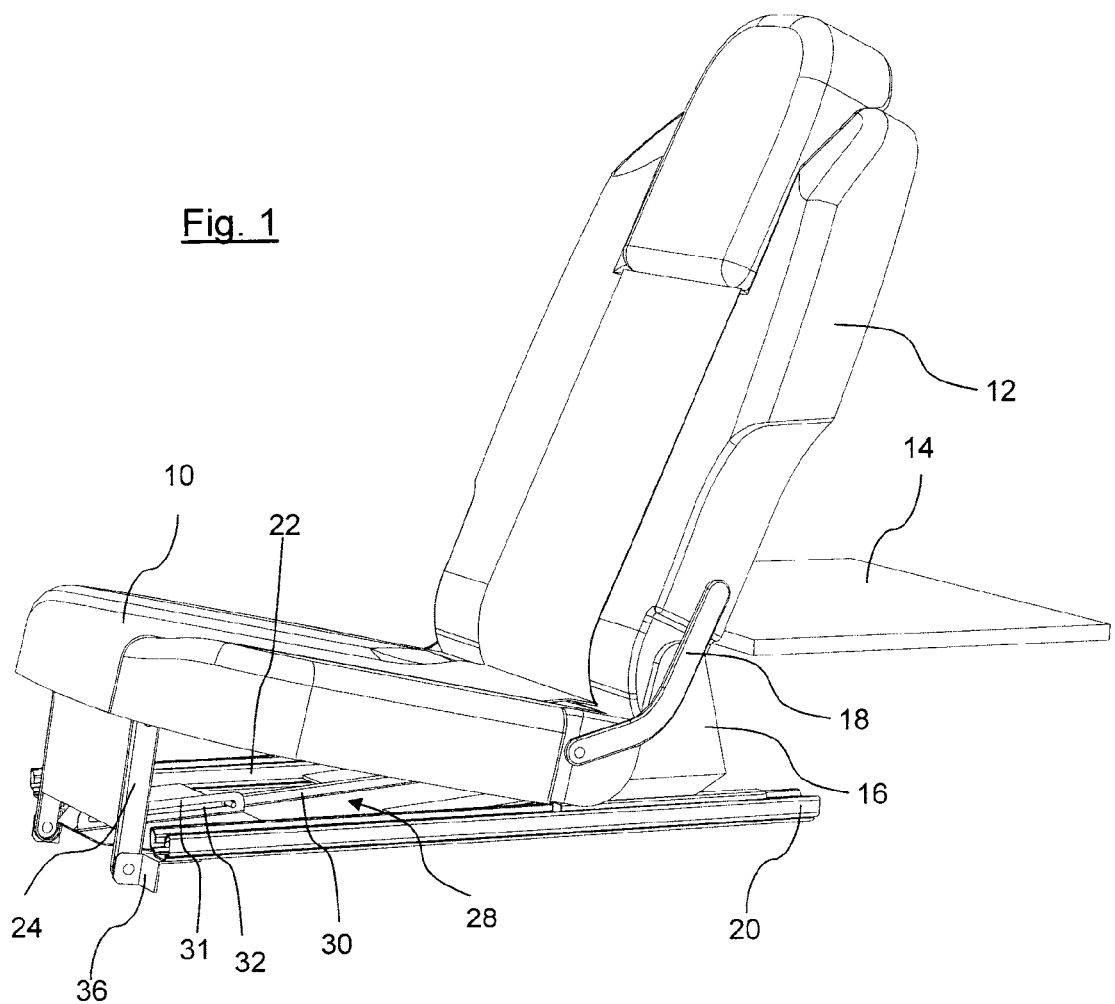
FIG. 1 shows a perspective illustration of the vehicle seat in its basic position.

The vehicle seat shown in FIG. 1 has a backrest 12 and a seat part 10, the backrest 12 being linked to a seat framework section 16 around a folding axis 26. The seat part 10 is fastened using its front section via a rocker 24 on the vehicle floor, in particular on a floor-side linkage point 36. The essentially linearly implemented rocker 24 is mounted so it is pivotable using its lower section on the linkage part 36, while it is linked using an upper section so it is pivotable on the bottom side of the seat part 10.

In the basic position shown in FIG. 1, the seat part 10 runs somewhat inclined to the rear, facing toward the backrest 12. The rear section of the seat part 10 facing toward the backrest 12 is mechanically coupled via a rear rocker 18 to the backrest 12. The rear rocker 18 is implemented as curved and causes a particular corresponding coupling between the backrest 12 and the seat part 10, depending on whether the vehicle seat is to be transferred into the first or second folded position.

Figure 4:
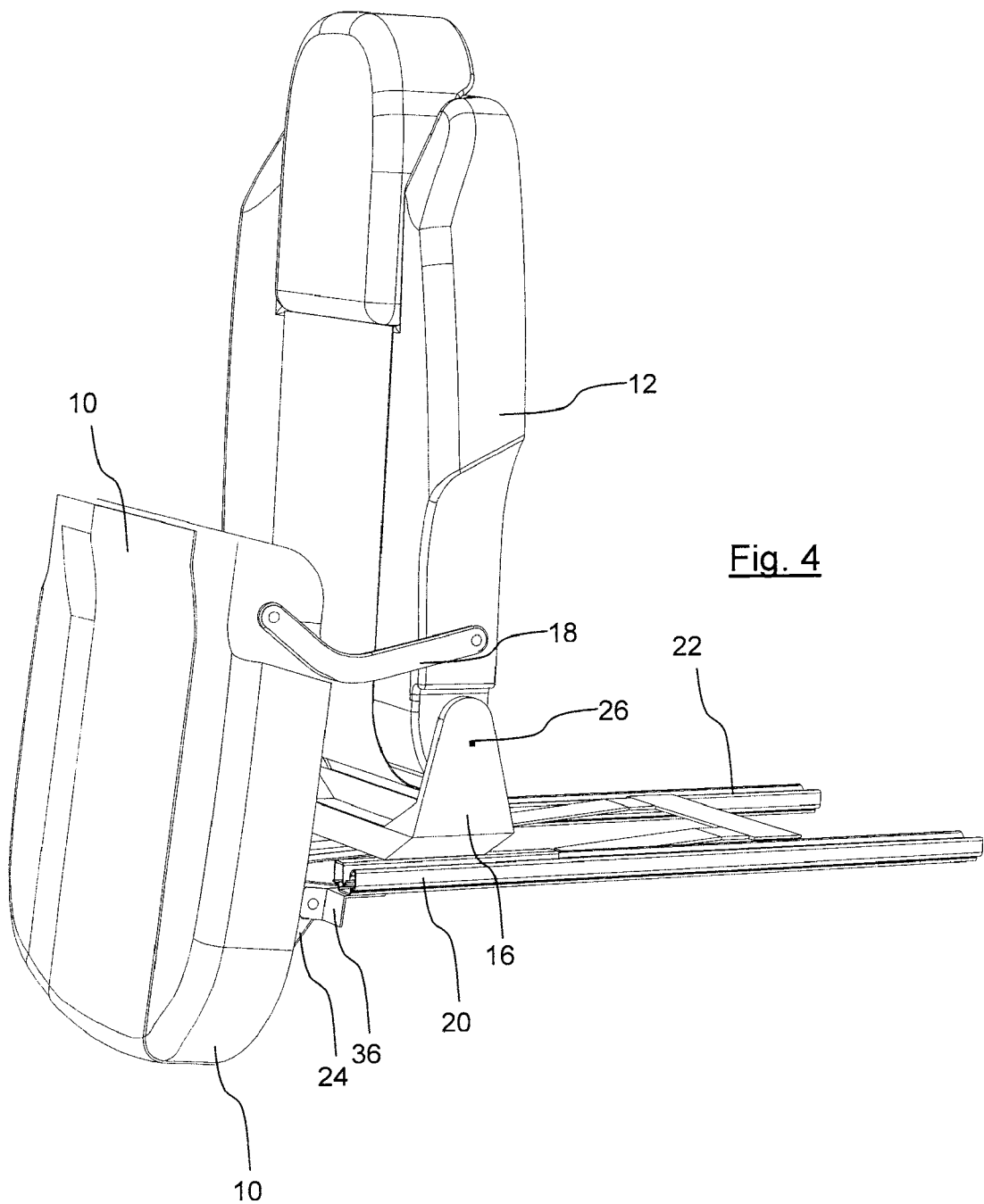
FIG. 4 shows the vehicle seat in the second folded position in a perspective diagonally from the front.
Figure 5:
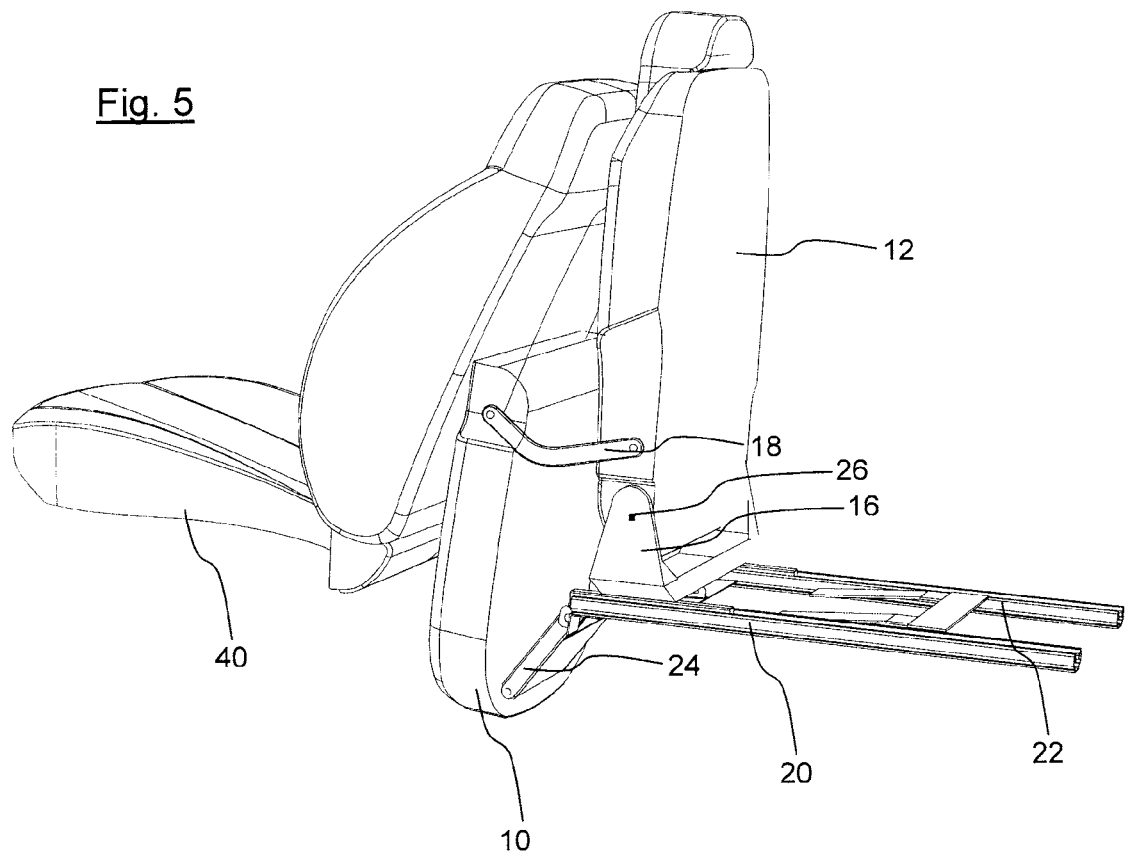
FIG. 5 shows the vehicle seat from FIG. 4 in a perspective diagonally from the rear.
Figure 8:
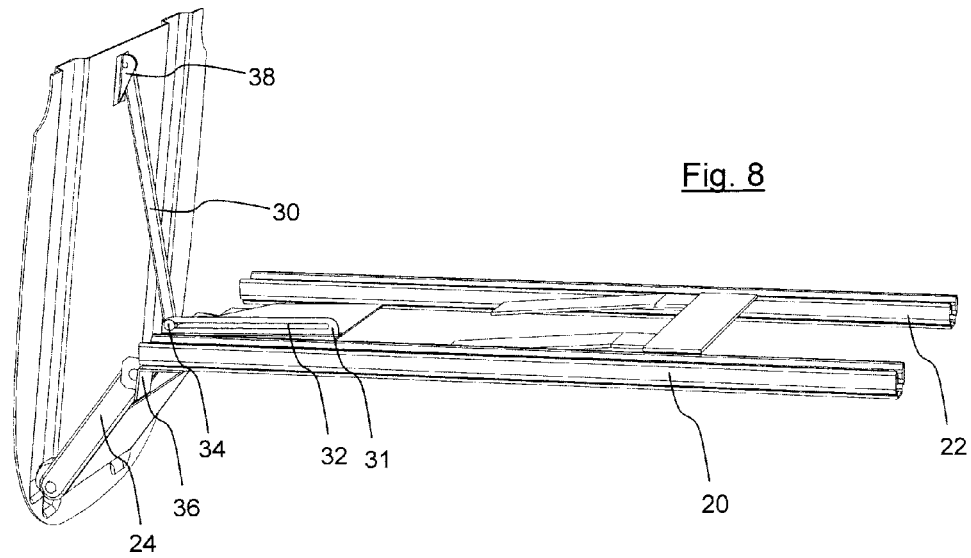
FIG. 8 shows the seat part floor in the second folded position.

The seat framework section 16 is displaceable in the longitudinal direction on floor-side guides 20, 22, which are implemented as seat longitudinal rails, in order to be able to transfer the vehicle seat into the second folded position shown in FIG. 4, FIG. 5, and FIG. 8.

At the height of the seat part 10, a longitudinal guide 31, which has an oblong hole 32 running in the vehicle longitudinal direction, is situated between the two longitudinal rails 20, 22 on the vehicle floor, which is not explicitly shown in the figures. A folding lever 28 is guided in this oblong hole 32, which has a rigid rod 30, which is linked and/or situated so it is both pivotable and also longitudinally displaceable in the oblong hole 32. On the other end, the rod 30 of the folding lever 28 is fastened so it is pivotable via a joint 38 on the bottom side of the seat part 10, as shown in the illustration of FIG. 8.

Figure 2:
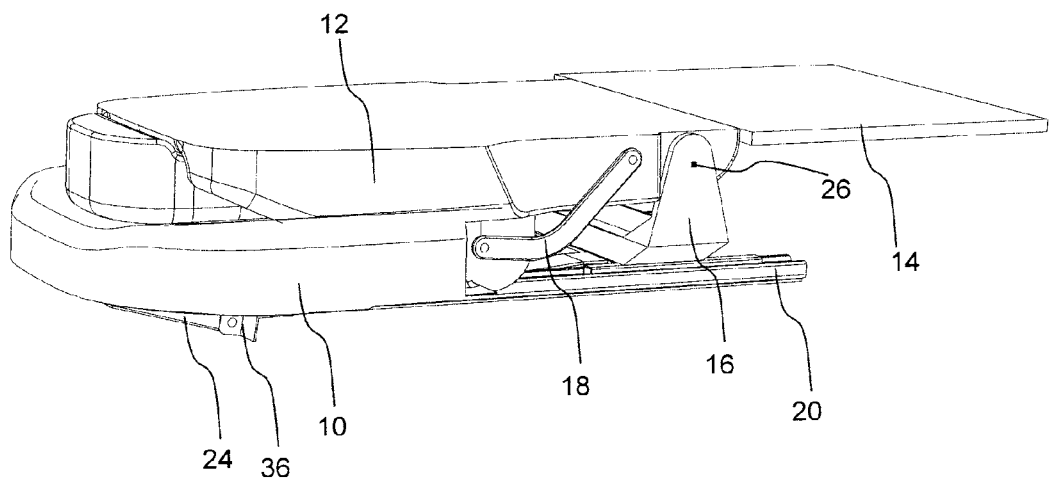
FIG. 2 shows a perspective illustration of the vehicle seat in the first folded position.
Figure 3:
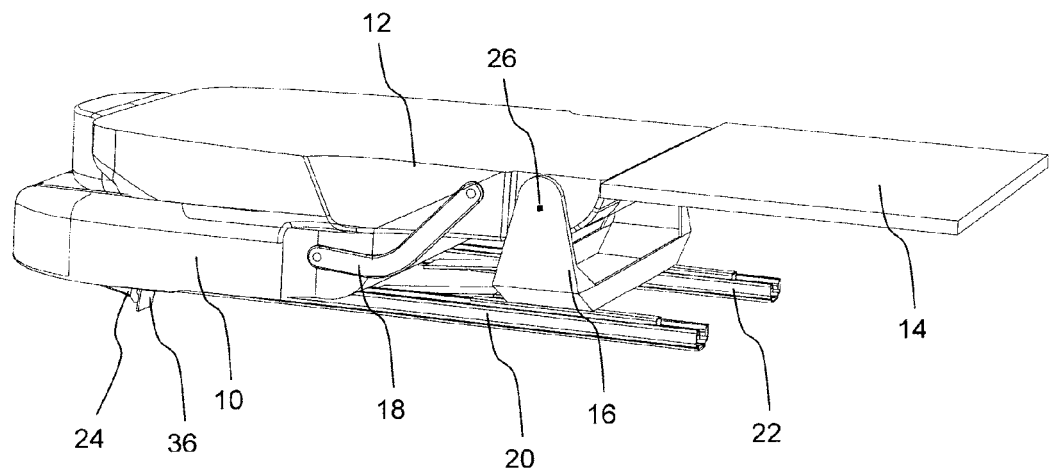
FIG. 3 shows a further perspective illustration of the vehicle seat in the first folded position.

The vehicle seat is shown in its first folded position in FIG. 2 and FIG. 3. Starting from the basic position shown in FIG. 1, to transfer the seat into this first folded position, firstly, a lock, which is not explicitly shown, of the backrest 12 is disengaged, so that it may be pivoted forward. A rear section of the seat part 10 simultaneously remains positively guided on the seat rails 20, 22, so that this rear section of the seat part 10 may be displaced between the two positions shown in FIG. 1 and FIG. 2 as a result of a pivot movement of the backrest 12.

The displacement of the seat part 10 into the first folded position, which is lowered in relation to the basic position from FIG. 1, according to FIG. 2 and FIG. 3 is performed by the coupling between backrest 12 and seat part using the rear rocker 18. Thus, if the backrest is folded over forward and thus pivoted around the folding axis 26, the rear rocker 18, because of its mounting spaced apart radially from the folding axis 26, transmits a translational movement to the rear section of the seat part 10, which is positively guided along the seat rails 20, 22.

The front section of the seat part 10 executes a movement like a circular arc, which is predetermined by the geometry and the linkage of the rocker 24, until the bottom side of the seat part 10 comes to rest nearly completely on a front section of the rails 20, 22, as indicated in FIG. 2 and FIG. 3. In this first folded position, the seat part 10 is situated essentially parallel to the vehicle floor and/or parallel to the cargo floor 14. Through the at least regional lowering of the seat part 10, the front side of the backrest 12 may come into contact with the top side of the seat part 10 and the rear side of the backrest may come to rest in an elongation of the cargo floor 14, so that overall a cargo area which is enlarged to the front may be provided.

The cargo space of the vehicle is thus expanded to the front in the way shown, the thickness of the seat components coming to rest on one another (i.e., seat part 10 and backrest 12), defining a distance between the rails 20, 22 and the cargo floor 14, by which the free cargo height of the cargo space is reduced.

The second folded position of the vehicle seat shown in FIG. 4, FIG. 5, and FIG. 8 provides an alternative solution in this regard. In this case, it is provided that, starting from the basic position shown in FIG. 1, the positive guiding of the rear section of the seat part 10 in relation to the rails 20, 22 is canceled and the locking of the seat framework section 16 relative to the rails 20, 22 is disengaged. Also, starting from the basic position shown in FIG. 1, a possibly provided lock of the backrest 12 is disengaged, so that it may be transferred into a completely upright position, as shown in FIG. 4 and FIG. 5, and locked therein.

The pivot movement of the backrest 12, connected to a displacement of the entire backrest 12 directed forward, including the seat framework section 16, results in pivoting of the seat part 10 into the second folded position shown in FIG. 4, FIG. 5, and FIG. 8.

Because of the pivotable linkage of the seat part 10 using front rocker 24, rear rocker 18, and folding lever 28, the rear section of the seat part 10 experiences raising in relation to the rails 20, 22. Furthermore, the front rocker 24 is pivoted between the basic position and the second folded position by much more than 90°, typically by approximately 130° to approximately 160°.

Simultaneously, the folding lever 28 linked on the rear section of the seat part 10 transfers into the raised position shown in FIG. 8, in particular under the action of a spring element situated in the joint 38. The longitudinal guide 31 provided with the oblong hole 32 has a supporting role in this case. Thus, upon transfer of the vehicle seat into its second folded position, the upright backrest 12 and the seat part 10 are moved forward along the guides 20, 22, 31 until the rigid rod 30 of the folding lever 28 having its pin 34 guided in the oblong hole 32 comes into contact with the front end section of the oblong hole 32, and/or strikes thereon.

Because of this displacement limiting and due to the front rocker 24, a further propulsion movement of the backrest 12 is converted nearly completely into a pivot movement of the seat part 10 directed forward and downward.

Figure 6:
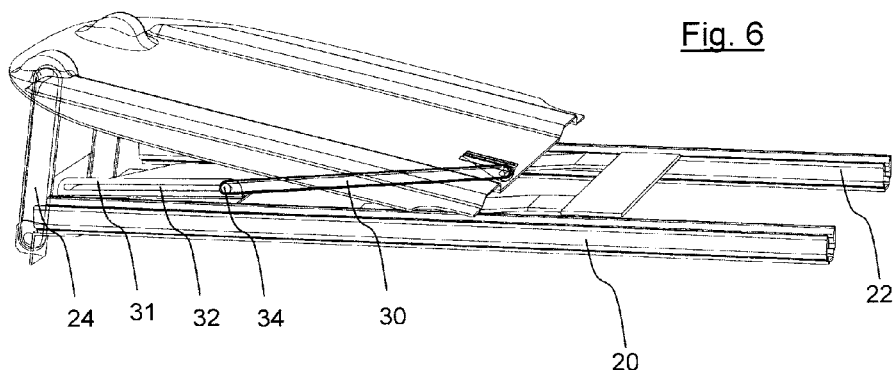
FIG. 6 shows a detail view of the seat part floor, mounted on seat longitudinal rails, in the basic position.
Figure 7:
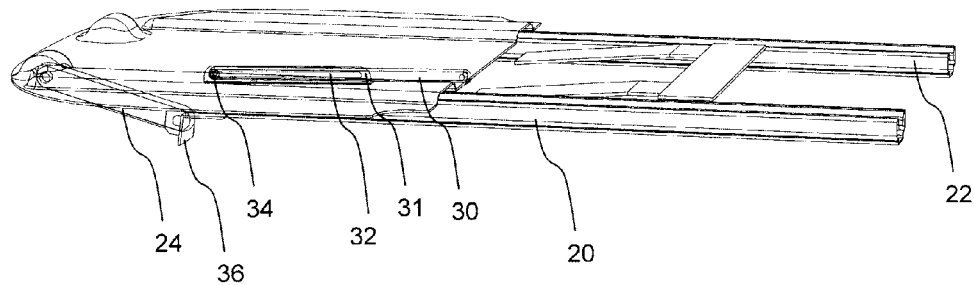
FIG. 7 shows the floor of the seat part in the first folded position.

In addition to this positive guiding function, the oblong hole 32 allows a translational displacement of the seat part 10 between its basic position shown in FIG. 6 and the first folded position illustrated in FIG. 7.

The leg spring, which is situated in particular in the area of the linkage 38, counteracts a possible dead center position of the pivot mechanism and provides a spring force which supports the actuation of the pivot movement.

The vehicle seat is provided in particular as part of a rear bench seat of a passenger automobile. It is particularly conceivable for this purpose to divide the entire rear bench seat into three or two modules, for example, in the ratio 40/20/40 or the ratio 60/40, each individual submodule being able to have a separate pivot and folding mechanism shown here.

In the second folded position of the vehicle seat in FIG. 5, the seat part 10 at least regionally plunges into a foot space provided behind a front seat 40, so that the backrest 12 may be shifted forward enough that a headrest section thereof comes into contact with the rear side of the front seat 40. In this folded position, a larger cargo space volume than in the first folded position may be provided in particular.

The seat part 10 and the backrest 12 are preferably lockable via multiple locking mechanisms or security units both in their basic position and also in the particular first and second folded positions. To transfer the vehicle seat out of the basic position into the first folded position, it is provided that the pivotability of the backrest 12 in relation to the seat framework section 16 is released and a possible lock of the rear section of the seat part 10 relative to the rails 20, 22 is released in such a way that the seat part 10 may be displaced using its rear section along the rails 20, 22, but cannot be raised from the rails 20, 22.

To transfer the vehicle seat into its second folded position, in contrast, it is provided that a locking of the rear section of the seat part 10 in relation to the rails 20, 22 is canceled completely, in order to thus allow pivotability of the seat part 10 and raising of its rear section relative to the rails 20, 22. Simultaneously, a longitudinal displaceability of the seat framework section 16 along the rails 20, 22 is to be ensured for this purpose.

The particular locking means provided for the seat part 10, the seat framework section 16, and the backrest 12 may be coupled among one another in such a way that, for example, a longitudinal displaceability of the seat framework section 16 is always accompanied by a complete release of the rear section of the seat part 10, or the positive guiding of the rear section of the seat framework 10 is always coupled to a locking of the seat framework section 16 on the rails 20, 22.

In this way, the various locking means provided on seat part 10 and backrest 12 may always only assume those locking and release positions in which the vehicle seat, starting from its basic position, is transferable either into the first folded position or into the second folded position in a defined way.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fold-down vehicle seat for a vehicle, comprising:
a seat part;
a foldable backrest;
a longitudinal rail;
a front rocker coupled to a front end of the longitudinal rail and adapted to provide a mount for the seat part to pivot around a first axis; and
a seat framework section configured to selectably traverse the longitudinal rail, the seat framework section including a mount for the foldable backrest to pivot around a second axis,
wherein the seat part and the foldable backrest are transferable into a first folded position, where the seat framework is at a first position along the longitudinal rail, and a second folded position, where the seat framework is at a second position along the longitudinal rail, to enlarge a cargo area of the vehicle that adjoins the fold-down vehicle seat,
wherein the seat part is directly coupled to the foldable backrest with a rear rocker, and
wherein the seat part and the foldable backrest are oriented essentially vertically in the second folded position.

2. The fold-down vehicle seat according to claim 1, wherein the rear rocker is linked at a first end on the seat part and at a second end on the foldable backrest above a folding axis.

3. The fold-down vehicle seat according to claim 1, wherein the rear rocker is implemented as curved shape and situated laterally to the foldable backrest and the seat part.

4. The fold-down vehicle seat according to claim 1, wherein the seat part is transferable using the rear rocker, as a result of a folding movement of the foldable backrest directed forward, into the first folded position, which is offset forward and lowered in relation to a basic position.

5. The fold-down vehicle seat according to claim 4, wherein the foldable backrest and the seat part comes to rest directly on one another upon reaching the first folded position and are oriented essentially parallel to a cargo floor.

6. The fold-down vehicle seat according to claim 1, wherein the seat part is guided for longitudinal displacement using a section coupled to the rear rocker.

7. The fold-down vehicle seat according to claim 1, wherein the seat framework section is displaceable forward along the longitudinal rail when the foldable backrest is transferred from the first folded position into the second folded position.

8. The fold-down vehicle seat according to claim 7, wherein a rear section of the seat part is transferred using a section coupled to the rear rocker to a position raised in relation to the longitudinal rails upon transfer into the second folded position.

9. The fold-down vehicle seat according to claim 1, wherein a rear section of the seat part faces toward the foldable backrest in a basic position and is linked to a folding lever that extends below the seat part and mounted at an end to be displaceable in a longitudinal guide.

10. The fold-down vehicle seat according to claim 9, wherein the folding lever is mounted using an end section facing toward the front rocker as to be pivotable and displaceable in an oblong hole of the longitudinal guide.

11. The fold-down vehicle seat according to claim 9, wherein a spring element is situated in an area of an attachment of the folding lever on the seat part.

12. The fold-down vehicle seat according to claim 1, wherein the seat framework section is lockable on the longitudinal rail.

13. The fold-down vehicle seat according to claim 1, wherein the seat part is lockable on the longitudinal rail at least using a section coupled to the rear rocker.

14. The fold-down vehicle seat according to claim 1, wherein the seat part is lockable in a basic position.

15. The fold-down vehicle seat according to claim 1, wherein the foldable backrest is lockable in a basic position.

16. The fold-down vehicle seat according to claim 1, wherein the rocker is coupled to a rear end of the seat part.

17. The fold-down vehicle seat according to claim 16, wherein the rear rocker is substantially curved.

* * * * *